UNITED STATES PATENT OFFICE 2,105,166

ELECTRICAL HEATING ELEMENT

Paul Schwarzkopf, Reutte, Austria

No Drawing. Application October 21, 1936, Serial No. 106,895. In Austria June 27, 1936

12 Claims. (Cl. 201—76)

In order to be able to use heating wires of molybdenum, tungsten or tantalum in high temperature ovens or furnaces, it has hitherto been necessary to use reducing and inert gases and sometimes work in vacuum, since such metals having a high melting point, begin to oxidize strongly between 500 and 700° C. In order to be able to utilize the high melting temperature of the said metals, it has been attempted to embed heating elements of these metals in oxides having high melting points, but no reliable gas-tight embedding has hitherto been achieved in this way.

It is also known to coat metals and metal alloys with a low melting point, such as for instance, nickel chromium wires with adhering metal oxides, by first providing a coating of magnesium metal and then converting it into magnesium oxide by steam under high pressure. Such oxide coatings adhere very well, but at their best they only form a useful electric insulating layer, since they are very porous and cannot prevent the penetration of gas.

The present invention has for its object the provision of a heating element of a metal having a high melting point and being provided with a ceramic covering which reliably and completely prevents the penetration of gases, more particularly of the oxygen in the atmosphere, to the metal core which is liable to oxidize. The gastight covering may be produced by the suitably composed sheathing being applied in colloidal form and being then fritted or sintered thereon, or by the covering being shrunk thereon in the form of a complete tube and then fritted or sintered thereon. The application and sintering of the ceramic covering in colloidal form may be effected in layers and repeated as required.

The innermost layer or layers are so chosen that the heating rod is surrounded by the purest metal oxides, such as aluminium oxide, magnesium oxide, thorium oxide, beryllium oxide and the like, which practically do not react with the metals having high melting points, even at the highest temperatures, viz. between 1400 and 2000° C. To the initial mixtures forming the outside layer or layers silica or silica oxides such as alumina-silica (also known as sillimanite), alumina-magnesia-silica etc. are added. These mixtures easily sinter to gas-tight fragments at temperatures over 1400° C. and are thereby converted. When use is made of a complete shrunk-on ceramic covering, the metal core is previously provided with a coating of purest metal oxide, such as aluminium oxide, or the pure metal is coated thereon for instance by evaporation which is subsequently oxidized.

The application of the individual layers of oxide may be effected in any well known manner, for instance by spraying or immersion into aqueous suspensions. It is, however, essential that the individual layers should be sintered at suitable temperatures of about 1400 to 2200° C., so that each time a firm union is produced between the new layer and the one preceding it.

As it is obvious to anybody skilled in the art, at such temperatures formation of compounds between the silica and alumina and/or magnesia present occurs. Thus it is well known that silica and alumina compound into sillimanite at temperatures ranging around about 1800° C. and similarly other chemical compounds are formed at highly elevated temperatures between the metal oxides referred to.

When the outer covering is applied in the form of more or less thin tubes, care must be taken that the sintering take place in a temperature range which will ensure sufficient plasticity, so that an intimate adherence and fritting may be obtained with the inner layer of pure oxide or oxides lying underneath.

The sintering of the layers of oxides is preferably effected in reducing and inert gases or in vacuum.

Having now particularly described and ascertained the nature of my said invention and in what manner the same is to be performed, I declare that what I claim is:

1. Electrical heating element adapted for operation in oxidizing atmosphere at temperatures of and above about 1400° C., comprising a core of refractory metal and a sintered cover containing metal oxide, said sintered cover in close touch with said core and consisting on the inside of metal oxide not reacting with the refractory core metal at operating temperatures and selected from a group consisting of pure oxide having a melting point over 1600° C. selected from oxides of metal other than silicon of the 2., 3., and 4. groups of the periodical system, and on the outside of a mixture containing said oxide as a major portion and an addition of an oxygen containing silicon compound in an appreciable amount having a melting point lower than said selected oxide sufficient to sinter all the oxide present into gas-tight fragments.

2. Electrical heating element adapted for operation in oxidizing atmosphere at temperatures of and above about 1400° C., comprising a core of refractory metal and a sintered cover containing metal oxide, said sintered cover fritted upon said core and consisting on the inside of metal oxide not reacting with the refractory core metal at operating temperatures and selected from a group consisting of pure oxides of aluminum, magnesium, thorium and beryllium, and on the outside of a mixture containing said oxide as a major portion and an addition of an oxygen containing silicon compound having a melting point lower than said selected oxide in an appreciable amount sufficient to sinter all the oxide present into gastight fragments.

3. Electrical heating element adapted for operation in oxidizing atmosphere at temperatures of and above about 1400° C., comprising a core of refractory metal and a sintered cover containing metal oxide, said cover sintered upon said core and consisting on the inside of metal oxide not reacting with the refractory core metal at operating temperatures and selected from a group consisting of pure oxides of aluminum, magnesium, thorium and beryllium, and on the outside of a mixture containing said oxide as a major portion and an addition of an oxygen containing silicon compound having a melting point lower than said selected oxide in an appreciable amount sufficient to sinter all the oxide present into gastight fragments.

4. Electrical heating element adapted for operation in oxidizing atmosphere at temperatures of and above about 1400° C., comprising a core of refractory metal and a sintered tubular cover containing metal oxide, said sintered tube fritted upon said core and consisting on the inside of metal oxide not reacting with the refractory core metal at operating temperatures and selected from a group consisting of pure oxides of aluminum, magnesium, thorium and beryllium, and on the outside of a mixture containing said oxide as a major portion and an addition of an oxygen containing silicon compound having a melting point lower than said selected oxide in an appreciable amount sufficient to sinter all the oxide present into gas-tight fragments.

5. Electrical heating element adapted for operation in oxidizing atmosphere at temperatures of and above about 1400° C., comprising a core of refractory metal and a sintered tubular cover containing metal oxide, said tube shrunk and fritted upon said core and consisting on the inside of metal oxide not reacting with the refractory core metal at operating temperatures and selected from a group consisting of pure oxides of aluminum, magnesium, thorium and beryllium, and on the outside of a mixture containing said oxide as a major portion and an addition of an oxygen containing silicon compound having a melting point lower than said selected oxide in an appreciable amount sufficient to sinter all the oxide present into gas-tight fragments.

6. Electrical heating element adapted for operation in oxidizing atmosphere at temperatures of and above about 1400° C., comprising a core of refractory metal and a sintered cover containing metal oxide, said cover sintered upon said core at temperatures between about 1400° and 2200° C. and consisting on the inside of metal oxide not reacting with the refractory core metal at operating temperatures and selected from a group consisting of pure oxides of aluminum, magnesium, thorium and beryllium, and on the outside of a mixture containing said oxide as a major portion and an addition of an oxygen containing silicon compound having a melting point lower than said selected oxide in an appreciable amount sufficient to sinter all the oxide present into gas-tight fragments.

7. Electrical heating element adapted for operation in oxidizing atmosphere at temperatures of and above about 1400° C., comprising a core of refractory metal and a sintered cover containing metal oxide, said sintered cover consisting on the inside close to and in touch with said core entirely of metal oxide having a melting point above 1800° C. and being incapable of reacting with said core metal at operating temperatures, said oxide selected from oxides of metal of the 2., 3., and 4. groups of the periodical system, and on the outside of a gas-tight sintered product of a mixture containing a compound of silicon having a melting point lower than said selected oxide in an appreciable amount and a major portion of said metal oxide.

8. Electrical heating element adapted for operation in oxidizing atmosphere at temperatures of and above about 1400° C., comprising a core of highly refractory metal melting above 2000° C. and a sintered cover containing metal oxide, said cover consisting on the inside close to and in touch with said core entirely of at least one oxide having a melting point above about 1600° C. selected from oxides of metal of the 2., 3., and 4. groups of the periodical system, and on the outside of a stable sintered product of a mixture containing a compound of silicon in an appreciable amount and a major portion of a metal oxide melting above 1400° C. but below the first selected ones and selected from oxides of metal of the 2., 3., and 4. groups of the periodical system.

9. Electrical heating element adapted for operation in oxidizing atmosphere at temperatures of and above about 1400° C., comprising a core of highly refractory metal melting above 2000° C. and a sintered cover containing metal oxide, said cover consisting on the inside close to and in touch with said core entirely of at least one oxide having a melting point above about 1800° C. selected from oxides of metal of the 2., 3., and 4. groups of the periodical system, and on the outside of a stable sintered product of a mixture containing a compound of silicon in an appreciable amount and a major portion of a metal oxide melting above 1400° but below said selected oxide selected from oxides of metal of the 2., 3., and 4. groups of the periodical system.

10. Electrical heating element adapted for operation in oxidizing atmosphere at temperatures of and above about 1400° C., comprising a core of refractory metal and a sintered cover containing metal oxide, said cover consisting of at least two layers intimately connected into a unit by heat treatment, the inside layer of said cover adhering to said core and consisting entirely of pure oxide melting above 1800° C. selected from oxides of metal other than silicon of the 2., 3., and 4. groups of the periodical system, the outside layer of said cover consisting of a mixture containing a stable sintered product of a compound of silicon in an appreciable amount and of a major portion of metal oxide melting above 1400° C. but below said selected oxide.

11. Electrical heating element adapted for operation in oxidizing atmosphere at temperatures of and above about 1400° C., comprising a core of refractory metal and a sintered cover containing metal oxide, said cover consisting of at least two layers shrunk upon said core and thereby intimately connected with each other and said core into a gas-tight unit, the inside layer consisting entirely of oxide of metal melting above 1800° C. selected from oxides of metal other than silicon of the 2., 3., and 4. groups of the periodical system, the outside layer consisting of a gas-tight sintered product melting below said elected oxide but above about 1400° C. of a mixture containing a compound of silicon in appreciable amounts and of a major portion of oxide of metal selected from the 2., 3., and 4. groups of the periodical system.

12. Electrical heating element adapted for operation in oxidizing atmosphere at temperatures of and above about 1400° C., comprising a core of metal selected from a group consisting of tungsten, molybdenum and tantalum and a sintered cover consisting of metal oxide selected from a group consisting of alumina, magnesia, thoria, silica and beryllium oxide, the inside of said cover consisting entirely of at least one of said oxides melting above 1800° C. selected from said group and present in its pure state, the outside of said cover consisting of a sintered gas-tight product of silica and at least one of said metal oxides.

PAUL SCHWARZKOPF.